(12) United States Patent
Yang et al.

(10) Patent No.: US 12,341,240 B2
(45) Date of Patent: Jun. 24, 2025

(54) VEHICLE EXTERIOR DEVICE

(71) Applicant: HARADA INDUSTRY CO., LTD., Tokyo (JP)

(72) Inventors: Conglin Yang, Tokyo (JP); Hidekazu Kobayashi, Tokyo (JP); Takeshi Sakano, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 285 days.

(21) Appl. No.: 17/659,009

(22) Filed: Apr. 12, 2022

(65) Prior Publication Data

US 2022/0238988 A1 Jul. 28, 2022

Related U.S. Application Data

(63) Continuation of application No. PCT/JP2020/027801, filed on Jul. 17, 2020.

(30) Foreign Application Priority Data

Oct. 17, 2019 (JP) ................................. 2019-189922

(51) Int. Cl.
*H01Q 1/32* (2006.01)
*H04N 7/18* (2006.01)

(52) U.S. Cl.
CPC ............. *H01Q 1/3275* (2013.01); *H04N 7/18* (2013.01)

(58) Field of Classification Search
CPC ........ H01Q 1/22; H01Q 1/325; H01Q 1/3275; H01Q 1/42; H01Q 9/0407; H01Q 9/40; H01Q 21/28; H01Q 1/27; H01Q 1/32; H01Q 1/40; H01Q 1/405; B60R 1/00; B60R 11/02; H04N 7/18; F16J 15/10
See application file for complete search history.

(56) References Cited

U.S. PATENT DOCUMENTS

| | | | |
|---|---|---|---|
| 11,710,894 B1 * | 7/2023 | Espinal ................ | H01Q 1/3275 348/148 |
| 11,764,463 B2 * | 9/2023 | Thill .................... | H01Q 1/3275 361/728 |

(Continued)

FOREIGN PATENT DOCUMENTS

| JP | 2011-046331 A | 3/2011 |
|---|---|---|
| JP | 2018-069874 A | 5/2018 |

(Continued)

OTHER PUBLICATIONS

International Search Report in PCT/JP2020/027801, dated Sep. 1, 2020.

*Primary Examiner* — Jason M Crawford
(74) *Attorney, Agent, or Firm* — Global IP Counselors, LLP

(57) ABSTRACT

A vehicle exterior device includes: a base member; a cover attached to the base member in a watertight manner, the cover and the base member forming a housing space therebetween, the cover having at least one opening; a functional unit including a holder located on the base member in the housing space, and a functional component supported by the holder with a leading end thereof being exposed through the opening; and a sealing portion located around the opening between an outer face of the functional unit and an inner face of the cover.

15 Claims, 14 Drawing Sheets

(56) References Cited

U.S. PATENT DOCUMENTS

| | | | |
|---|---|---|---|
| 2012/0327234 A1* | 12/2012 | Fish, Jr. | H04N 7/185 |
| | | | 348/148 |
| 2014/0292593 A1* | 10/2014 | Thiam | H01Q 9/32 |
| | | | 343/893 |
| 2015/0307026 A1* | 10/2015 | Minikey, Jr. | B60R 11/04 |
| | | | 348/148 |
| 2017/0033449 A1* | 2/2017 | Talty | H01Q 1/3275 |
| 2017/0136959 A1* | 5/2017 | Denny | H04N 7/183 |
| 2017/0214130 A1* | 7/2017 | Grimes | H01Q 1/3283 |
| 2017/0257535 A1* | 9/2017 | Minikey, Jr. | H04N 23/54 |
| 2018/0076514 A1* | 3/2018 | Nugent | H01Q 1/1214 |
| 2018/0261912 A1* | 9/2018 | Mizuno | H01Q 1/32 |
| 2018/0284573 A1* | 10/2018 | Cammenga | B60R 11/04 |
| 2019/0036198 A1* | 1/2019 | Mizuno | H01Q 9/40 |
| 2019/0081391 A1* | 3/2019 | Yasin | G03B 29/00 |
| 2019/0237866 A1* | 8/2019 | Kiyokawa | H01Q 1/48 |
| 2021/0044006 A1* | 2/2021 | Shimizu | H04N 23/54 |
| 2021/0167489 A1* | 6/2021 | Hayashi | H01Q 1/38 |
| 2022/0238988 A1* | 7/2022 | Yang | H04N 7/18 |
| 2023/0187818 A1* | 6/2023 | Kondo | B60R 11/02 |
| | | | 343/702 |

FOREIGN PATENT DOCUMENTS

| | | | |
|---|---|---|---|
| JP | 2018-186360 A | | 11/2018 |
| KR | 20100137883 | * | 12/2010 |
| WO | 2017152025 A1 | | 9/2017 |
| WO | 2018079199 A1 | | 5/2018 |

* cited by examiner

VEHICLE EXTERIOR DEVICE

CROSS REFERENCE TO RELATED APPLICATIONS

This application is a continuation application of International Application No. PCT/JP2020/027801, filed on Jul. 17, 2020, which claims priority to and the benefit of Japanese Patent Application No. 2019-189922, filed on Oct. 17, 2019. The contents of these applications are incorporated herein by reference in their entirety.

BACKGROUND OF INVENTION

1. Field

The present invention relates to a vehicle exterior device on which additional functional components are mounted.

2. Description of Related Art

Vehicular antenna devices having streamlined external shapes, such as so-called shark fin antennas, have been known. Such antenna devices are excellent in design when being installed on roof panels, and have therefore recently been used for many vehicles.

An example of such antenna devices includes a functional component such as a camera, in addition to an antenna element for receiving AM and FM broadcast, to improve functionality (refer to WO 2018/079199, for example). A double cover structure constituted by an exterior case and an inner case is employed, electronic components such as a circuit board are housed in the inner case, and the functional component is supported by the inner case. Because components that needs to be protected against moisture are all put inside the inner case, the exterior case is not constrained by a structure for waterproof performance. This is advantageous in improving the design.

Related Art List (1) WO 2018/079199

In the meantime, with recent improvement in vehicle performance, the functions required of antenna devices have been increasing. Specifications supporting GPS and GNSS in addition to AM and FM broadcast may be required. Furthermore, specifications additionally including functional components such as a light emitting module to improve the design have also been proposed. As the number of internal components increases accordingly, it becomes difficult to ensure installation space therefor. The inner case may be increased in size to allow sufficient space, which, however, results in a larger antenna device as a whole including the exterior case. The increase in size cannot be achieved in a case where a height limit is set on the antenna device in terms of design and specification. It is therefore important to find ways to achieve space saving, and the double cover structure is a factor preventing space saving.

Note that achievement of both waterproof performance and space saving can be necessary for not only antenna devices but also any device on a vehicle exterior (hereinafter referred to as a "vehicle exterior device"). For example, a vehicle exterior device on which no antenna element is mounted also needs to prevent entry of moisture into a vehicle interior via an insertion hole through which a cable for a functional component (such as a light emitting module or a camera) passes. It is therefore important to secure the functions of sealing portions.

SUMMARY OF INVENTION

In view of the above and other circumstances, one of objects of the present invention is to provide a vehicle exterior device that achieves space saving and sufficient waterproof performance.

An embodiment of the present invention is a vehicle exterior device. The vehicle exterior device includes: a base member; a cover attached to the base member in a watertight manner, the cover and the base member forming a housing space therebetween, the cover having at least one opening; a functional unit including a holder located on the base member in the housing space, and a functional component supported by the holder with a leading end thereof being exposed through the opening; and a sealing portion located around the opening between an outer face of the functional unit and an inner face of the cover.

DETAILED DESCRIPTION

Figure 1A:
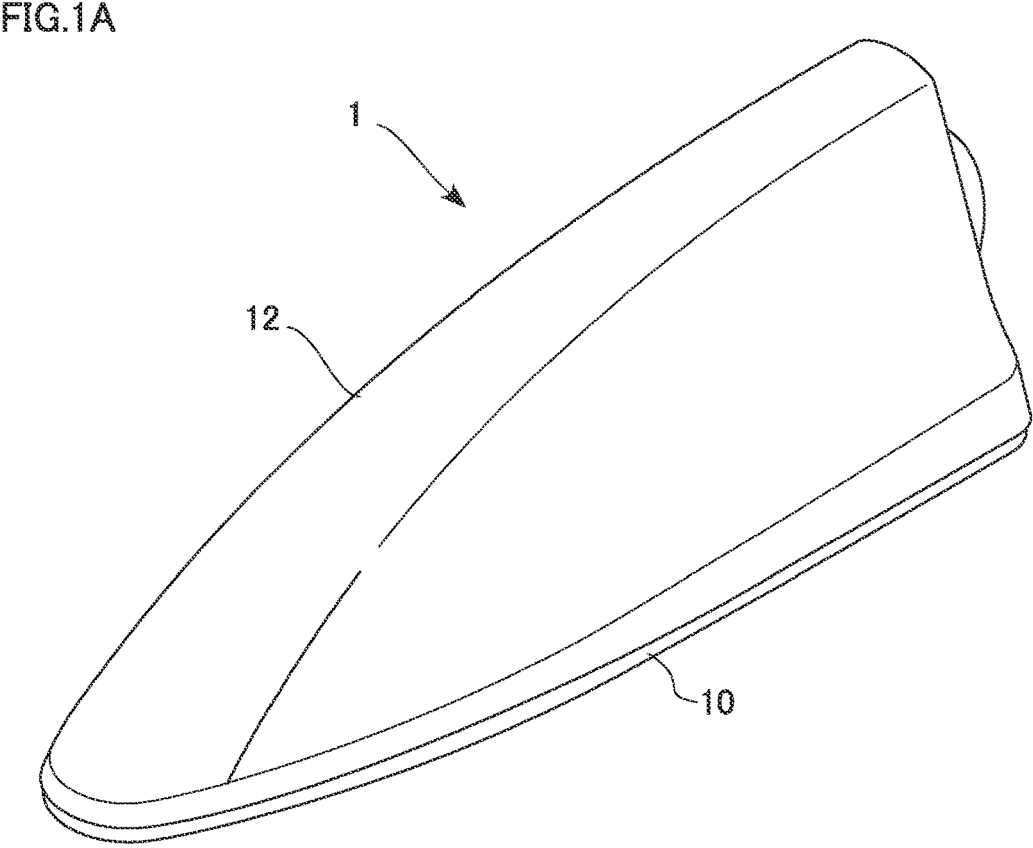
FIGS. 1A and 1B are external views of an antenna device according to a first embodiment.

Certain embodiments of the present invention will now be described with reference to the drawings. This is not intended to limit the scope of the present invention but to exemplify the invention.

The embodiments of the present invention will now be described in detail with reference to the drawings. In the following embodiments and modifications thereof, components that are substantially the same will be designated by the same reference numerals and redundant description thereof may be omitted as appropriate.

In each embodiment, an antenna device is presented as an example of a vehicle exterior device. The antenna device has a single cover structure for saving space so as to mount a plurality of antenna elements and a functional component. The cover has, on a side face thereof, an opening through which part of a functional component can be exposed. A waterproof structure is designed to simply and effectively prevent entry of moisture through the opening. Details thereof will be described below.

First Embodiment

Figure 1B:
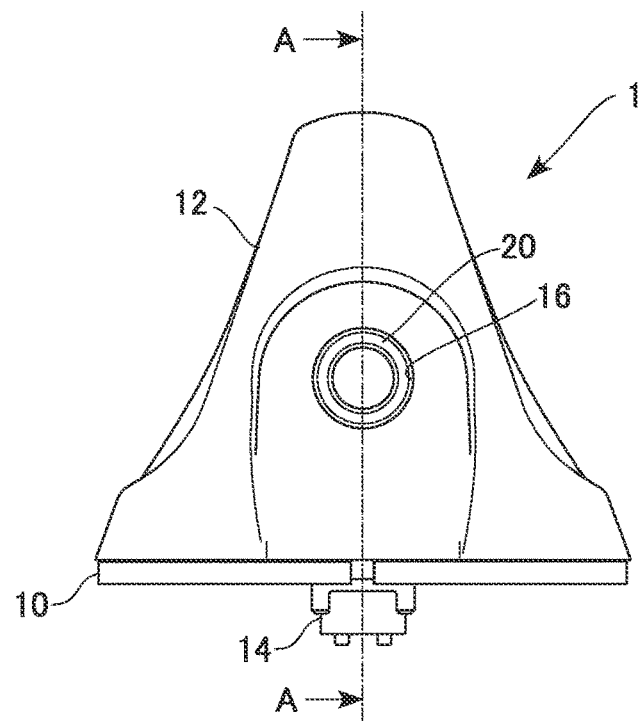

FIGS. 1A and 1B are external views of an antenna device according to a first embodiment. FIG. 1A is a perspective view, and FIG. 1B is a rear view. In the description below, for convenience of explanation, the positional relationship in the antenna device may be expressed in the front-back direction, the vertical direction, and the width direction in a state in which the antenna device is mounted on a vehicle.

The antenna device 1 is a low profile antenna device that is so-called a shark fin antenna, to be attached onto a roof panel of a vehicle, which is not illustrated. The antenna device 1 includes a base member 10, which constitutes a bottom thereof, and a cover 12 attached to the base member 10 in a watertight manner. The cover 12 is made of radio wave transparent plastic (such as ABS, PET, or PC). A housing space is formed between the base member 10 and the cover 12, in which the antenna elements and circuit boards thereof, which will be described later, are housed.

The base member 10 has an oval or triangular shape in plan view with its width gradually decreasing from back to front. A roof fixing portion 14 for fixing the antenna device 1 to the roof panel is disposed to protrude from the middle of a lower face of the base member 10. The roof fixing portion 14 is inserted in an attaching hole formed through the roof panel. A nut is fastened to the roof fixing portion 14 with a ground washer therebetween, so that the base member 10 is fixed to the roof panel.

The cover 12 has a triangular shape in front view, and has a streamline shape (shark fin shape) with its height gradually decreasing and its width gradually decreasing from back to front. An opening lower end of the cover 12 is attached along a circumferential edge of the base member 10. The cover 12 has a back face with an opening 16, through which a leading end of the camera 20 (functional component) is exposed.

Figure 2:
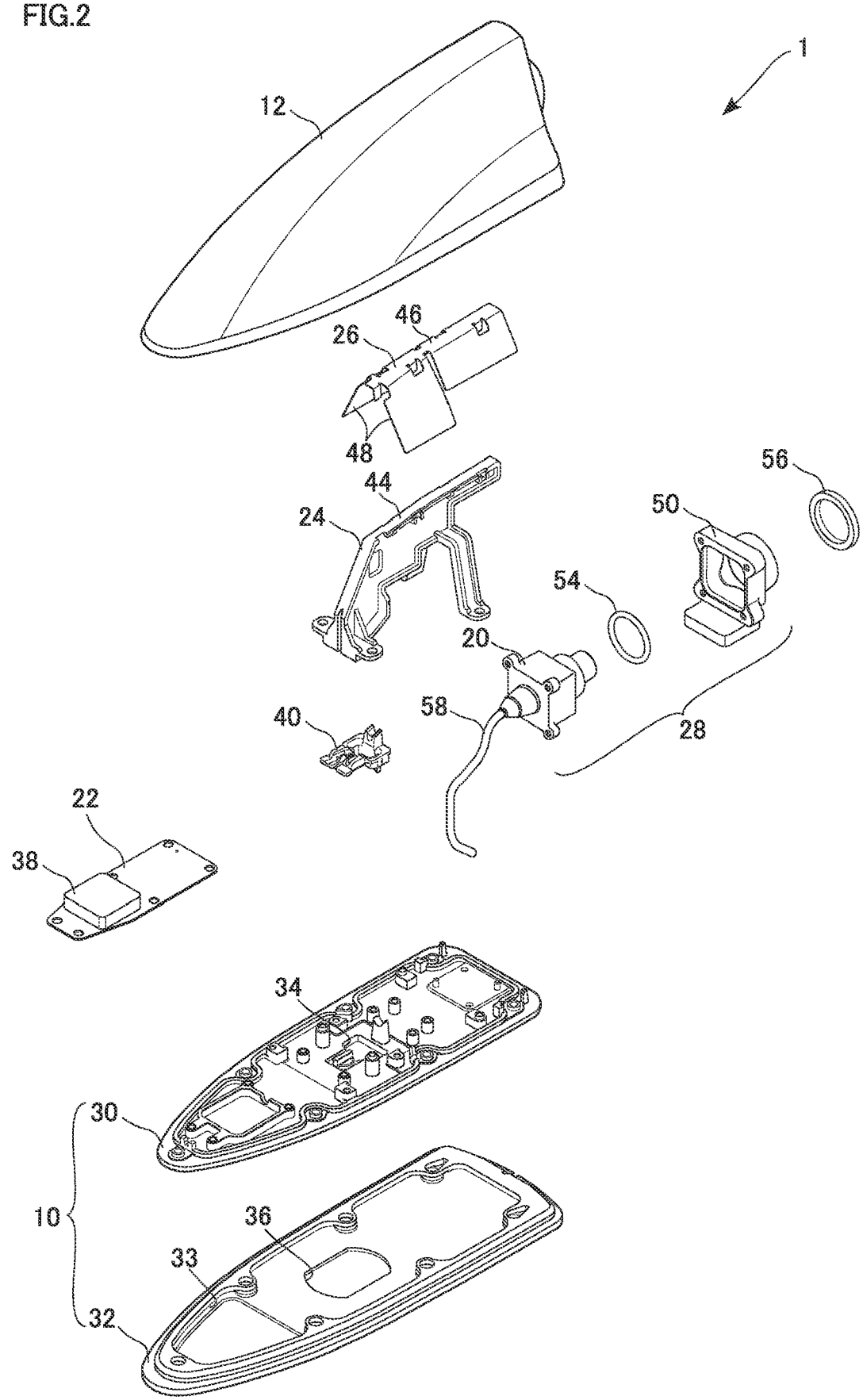
FIG. 2 is an exploded perspective view of the antenna device.

FIG. 2 is and exploded perspective view of the antenna device 1.

The antenna device 1 includes a circuit board 22, a support member 24, an antenna element 26, a camera unit 28, and so on, which are attached onto the base member 10 and covered by the cover 12. The support member 24 is a member for supporting the antenna element 26. The antenna element 26 is receive radio waves of AM and FM broadcast, and is connected with the circuit board 22 via an antenna coil, which is not illustrated. The camera unit 28 includes the camera 20, and functions as a "functional unit".

The base member 10 includes an antenna base 30 and a seal pad 32. The antenna base 30 is a conductive base made of die-cast aluminum, or may alternatively be made of stainless steel or other conductive metal. The roof fixing portion 14 is integrated with the antenna base 30. The nut is fastened to the roof fixing portion 14 as described above, which causes the ground washer to break through a coating of the roof panel, and the middle part of the lower face of the antenna base 30 is electrically connected with the roof panel. This enables the antenna device 1 to ground to the vehicle body.

The seal pad 32 is an insulator made of flexible resin (rubber, for example) for sealing between the antenna base 30 and the roof panel. The seal pad 32 is slightly larger than the antenna base 30. A peripheral edge of the seal pad 32 is folded inward to form a recessed fitting portion 33. The seal pad 32 is placed to cover the antenna base 30 with the circumferential edge of the antenna base 30 fitted in the recessed fitting portion 33 to form the base member 10. The cover 12 is attached to the base member 10 in a watertight manner with the seal pad 32 between the cover 12 and the antenna base 30.

A plurality of bosses for screwing components stand on the top face of the antenna base 30. The antenna base 30 has, at the center thereof, an insertion hole 34 through which a cable passes. The seal pad 32 has, at the center thereof, an insertion hole 36 through which a lower face of a middle portion of the antenna base 30 is exposed and through which the cable passes. The roof fixing portion 14 is placed through the insertion hole 36.

Circuits such as an amplifier for amplifying signals received by the antenna element 26, and a patch antenna 38 and circuits thereof are mounted on the circuit board 22. The patch antenna 38 includes an antenna element for GPS, for example. The circuit board 22 is fixed to a front area of the antenna base 30.

A guiding member 40 is fixed to a central area of the antenna base 30, and the support member 24 is fixed over the guiding member 40. The guiding member 40 is a member for guiding a cable 58 of the camera 20. The guiding member 40 and the support member 24 are made of insulating materials (resin). The support member 24 extends above the antenna base 30, and has an upper face being a supporting face 44 extending in the front-back direction.

The antenna element 26 is produced by bending a conductive metal sheet, and has a bifurcated shape. The antenna element 26 includes a body 46 extending in parallel with the supporting face 44, and extending portions 48 extending obliquely downward from respective sides of the body 46. While the antenna element 26 has a V-shaped cross section in the present embodiment, the antenna element 26 may have a U-shaped cross section or other shapes.

The antenna element 26 is fixed to the support member 24 with the body 46 placed on the supporting face 44. In this manner, the antenna element 26 is held at a high position, and placed not to overlap with the circuit board 22 in plan view, to improve the receiving performance.

The camera unit 28 includes the camera 20 attached to a holder 50. The holder 50 is fixed to the antenna base 30, and the camera 20 is supported by the holder 50. A seal ring 54 is arranged between the camera 20 and the holder 50. The seal ring 54 is an O ring that functions as a "second sealing portion" in the present embodiment.

A seal ring 56 is attached to a leading end face (on the side of the opening 16 of the cover 12) of the holder 50. The seal ring 56 is made of urethane foam, and functions as a "first sealing portion" in the present embodiment. Examples of the urethane foam include PORON (registered trademark), which is a microcellular polymer sheet. The seal ring 56 has an appropriate elasticity, and is softer than the seal ring 54. The seal ring 56 has a compressibility (approximately 30%) higher than that (approximately 20%) of the seal ring 54. Details of these sealing members will be described later.

The cable 58 extends from the camera 20. The cable 58 is a coaxial cable that is guided by the guiding member 40 and drawn out of the antenna device 1 via the insertion holes 34 and 36. A cable connected with the circuit board 22 is similarly drawn out. These cables are drawn into the vehicle body via a cable entry hole formed through the roof panel.

Figure 3:
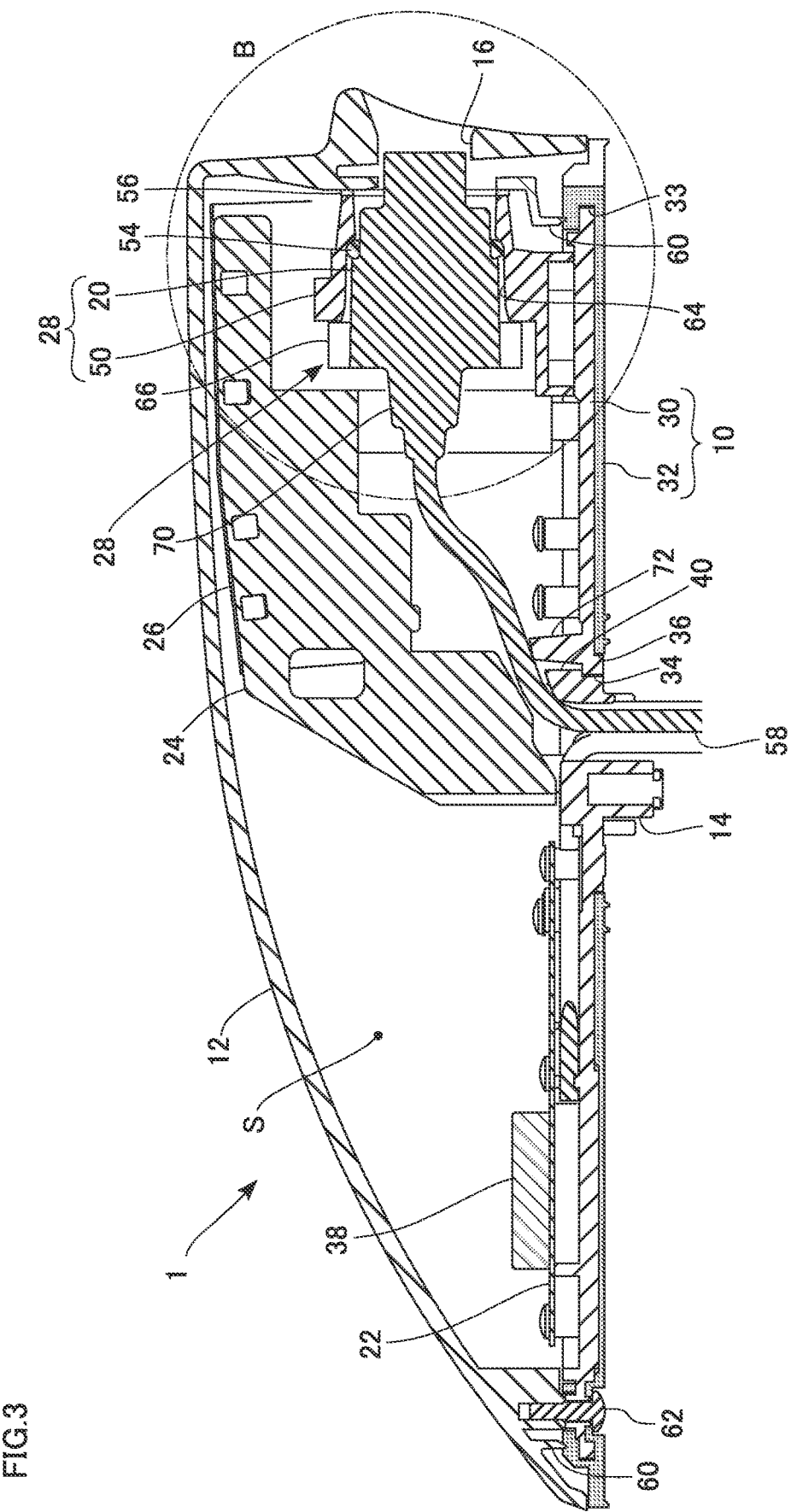
FIG. 3 is a cross-sectional view along arrows A-A in FIG. 1B.
Figure 4:
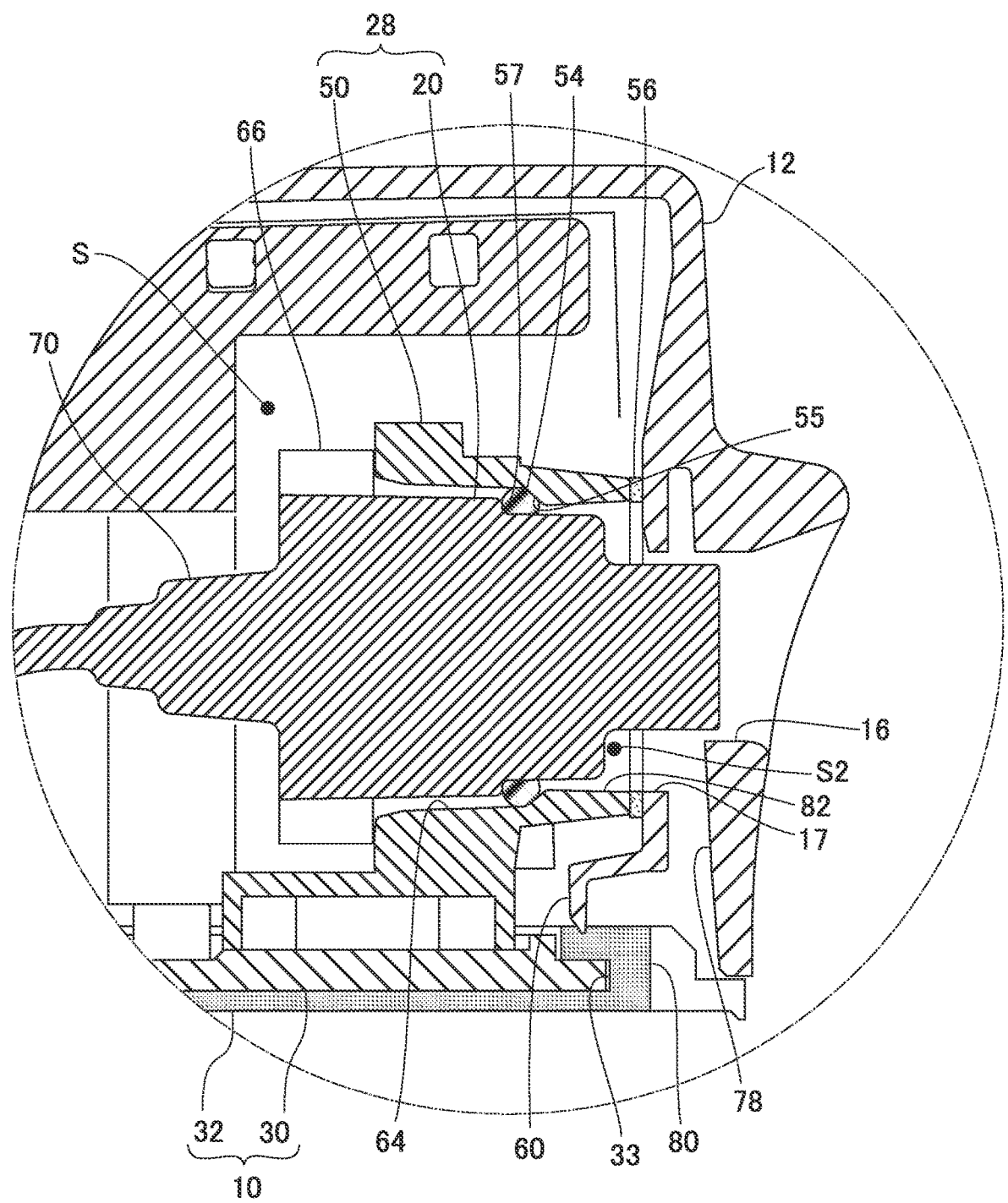
FIG. 4 is an enlarged view of part B in FIG. 3.

FIG. 3 is a cross-sectional view along arrows A-A in FIG. 1B. FIG. 4 is an enlarged view of part B in FIG. 3.

As illustrated in FIG. 3, an annular protrusion 60 is formed near and along the circumferential edge of the opening lower end of the cover 12. The cover 12 is attached to the base member 10 with the end of the annular protrusion 60 biting into the upper face of the seal pad 32, so that watertightness between the cover 12 and the base member 10 is achieved. The cover 12 and the antenna base 30 are fixed to each other with a plurality of screws 62 (one of which is illustrated in FIG. 3).

A housing space S is formed between the cover 12 and the base member 10. The components including the antenna element 26, the circuit board 22, and the camera unit 28 are arranged in the housing space S. In the present embodiment, because a single cover type is employed in the antenna device 1, the internal components, such as the circuit board 22, that need to be protected against moisture are exposed to the housing space S as illustrated.

The holder 50 is fixed to a back area of the antenna base 30. An insertion hole 64 is formed through the holder 50 in the front-back direction. The insertion hole 64 coaxially communicates with the opening 16 of the cover 12. The camera 20 is inserted in the insertion hole 64 and supported by the holder 50. A plurality of fixing portions are formed to protrude from the outer circumferential face of the camera 20, and fixed to the holder 50 with screws (not illustrated). A leading end (lens part) of the camera 20 is exposed to the opening 16.

A connector 70 for the cable 58 is connected to the back face of the camera 20. A supporting portion 72 is formed to protrude from the middle of the antenna base 30. The cable 58 is guided by the supporting portion 72 and the guiding member 40, and drawn downward through the insertion hole 34.

As illustrated in FIG. 4, the inner circumferential face of the holder 50 has a tapered face 55 with its diameter gradually decreasing backward (toward the opening 16). The outer circumferential face of the camera has a stepped portion 57 with its diameter decreasing backward. The seal ring 54 is fitted to the stepped portion 57. The camera 20 is inserted into the holder 50 from the front (left in the drawing), and the fixing portions 66 come in contact with the front end face of the holder 50. This defines the insertion position of the camera 20 in the holder 50 (that is, the position of the camera 20 relative to the holder 50).

The seal ring 54 is arranged between the inner circumferential face of the holder 50 and the outer circumferential face of the camera 20 to prevent entry of moisture into the housing space S via a gap between the holder 50 and the camera 20. More specifically, the seal ring 54 is axially and radially compressed between the stepped portion 57 of the camera 20 and the tapered face 55 of the holder 50, and fulfills the sealing function.

The seal ring 56 is arranged between an open end of the holder 50 and the inner circumferential face of the cover 12 and extends around the opening 16. This prevents entry of moisture into the housing space S via a gap between the holder 50 and the cover 12. More specifically, the seal ring 56 is axially compressed between the back end (open end) of the holder 50 and the inner circumferential face of the back side of the cover 12, and fulfills the sealing function.

Although entry of moisture into the opening 16 is permitted, the two seal rings 54 and 56 make the space inner than the camera unit 28 waterproof. Although the leading end (lens part) of the camera 20 is exposed to the opening 16 for imaging of the outside, this is not a problem because the camera (functional component) itself is waterproof.

A communication hole 78 extending downward from the opening 16 is formed in a back wall of the cover 12. In addition, a slit 80 (cutout) in the up-down direction is formed in a back portion of the seal pad 32. The communication hole 78 communicates with the slit 80. The communication hole 78 is thus open to the outside (atmosphere) of the cover 12.

The inner circumferential face of the holder 50 has an inclined face 82 on the back side of the tapered face 55. The inclined face 82 is a tapered face with its diameter increasing toward the open end of the holder 50. A stepped area 17 that communicates with the communication hole 78 is formed under the opening 16. As illustrated, the inner diameter of the seal ring 56 is substantially equal to but slightly larger than the inner diameter of the open end of the holder 50. The bottom of the stepped area 17 is at a position slightly lower than the inner circumference of the seal ring 56. In this structure, an exposure space S2, which is outside of the seal ring 54 and surrounded by the holder 50 and the camera 20, communicates with the communication hole 78 via the opening 16. Thus, even if moisture is accumulated in the exposure space S2, the moisture is likely to be guided along the inclined face 82 to the communication hole 78 and discharged to the outside.

Figure 5A:
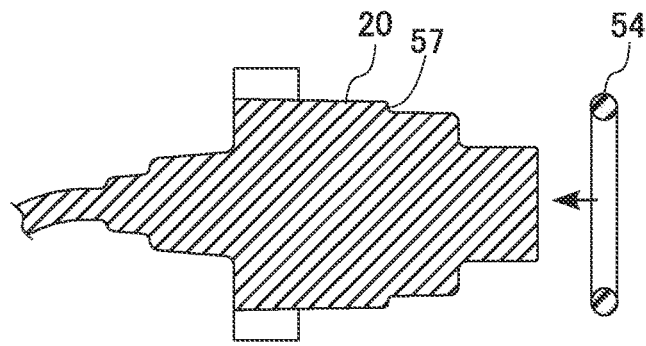
FIGS. 5A to 5D illustrate a method for attaching a sealing portion.
Figure 5B:
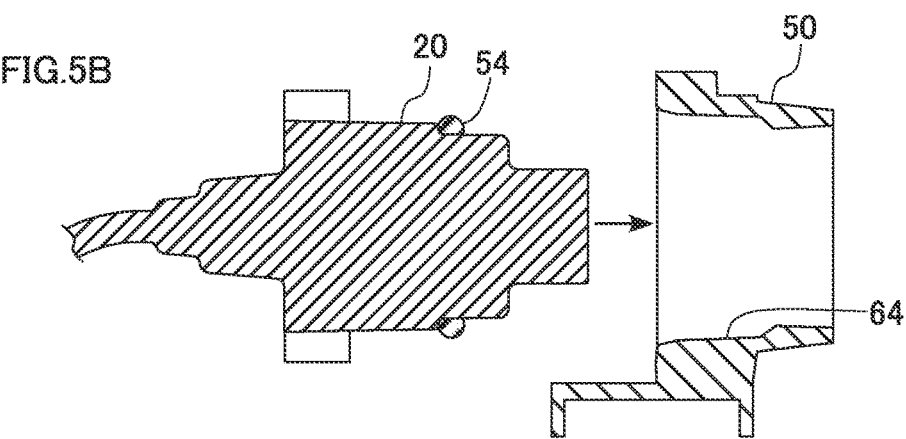
Figure 5C:
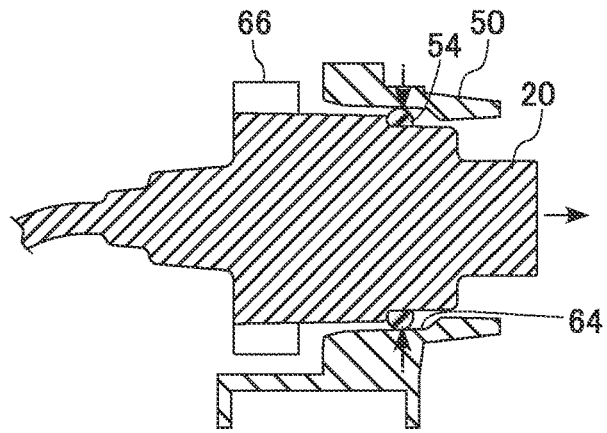
Figure 5D:
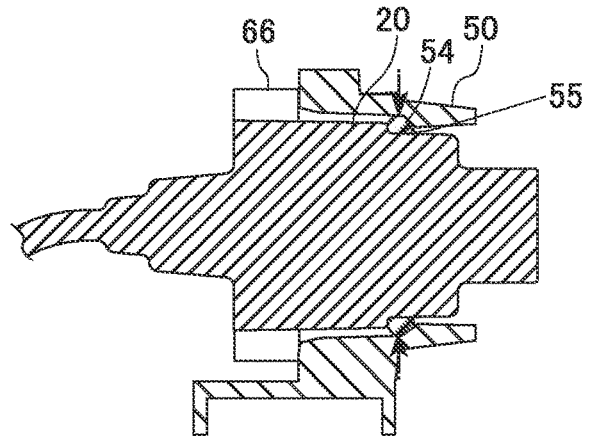
Figure 6A:
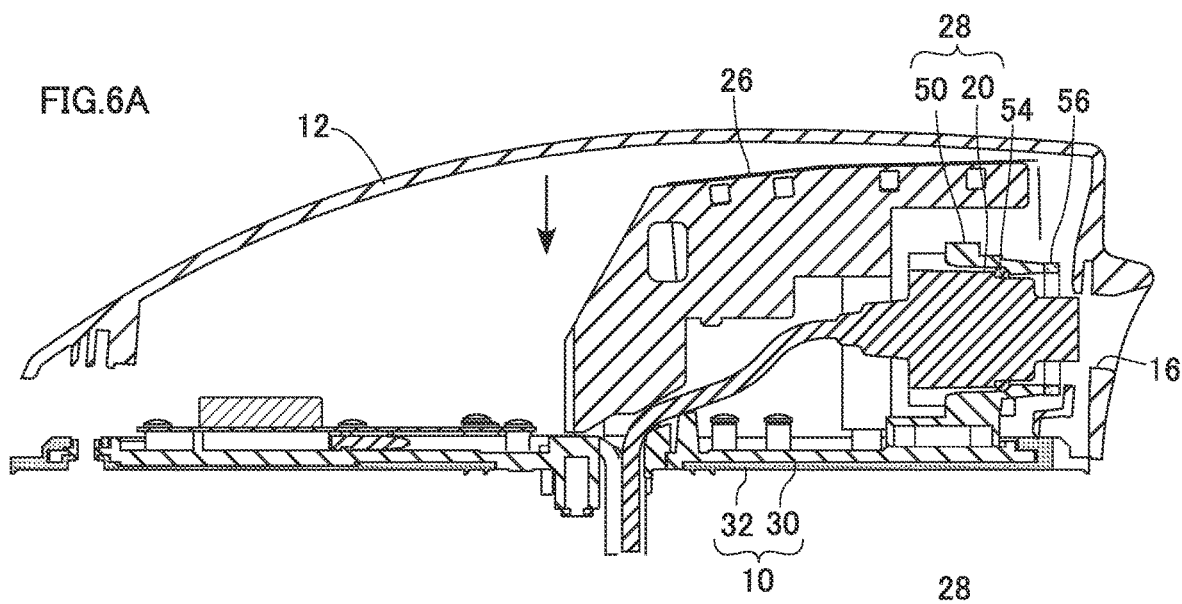
FIGS. 6A to 6C illustrate a method for attaching a sealing portion.
Figure 6B:
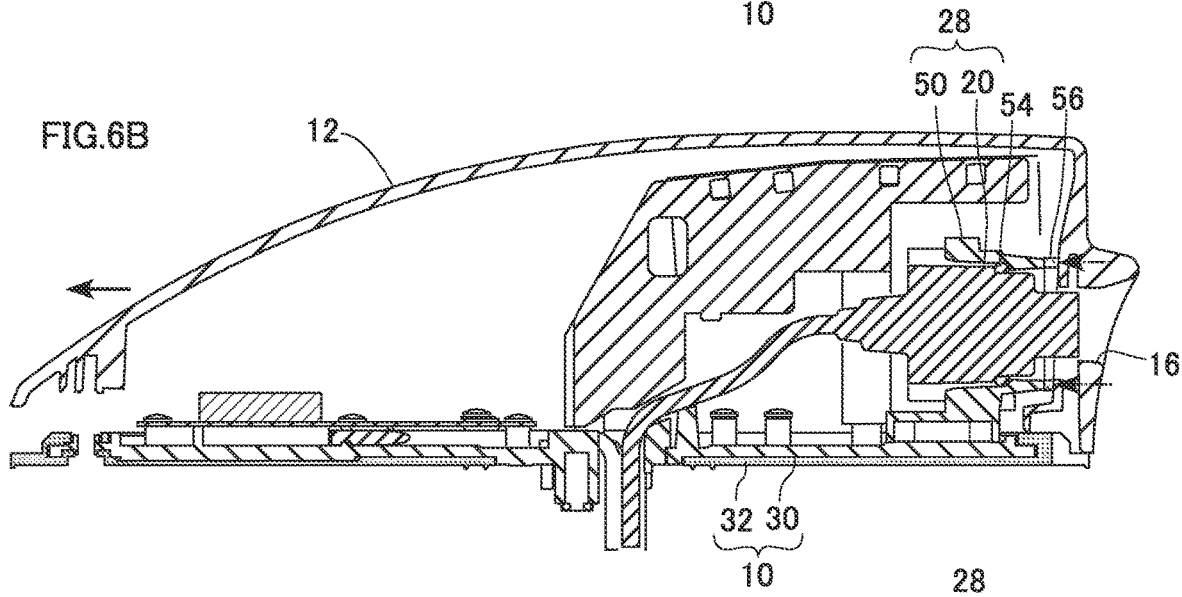
Figure 6C:
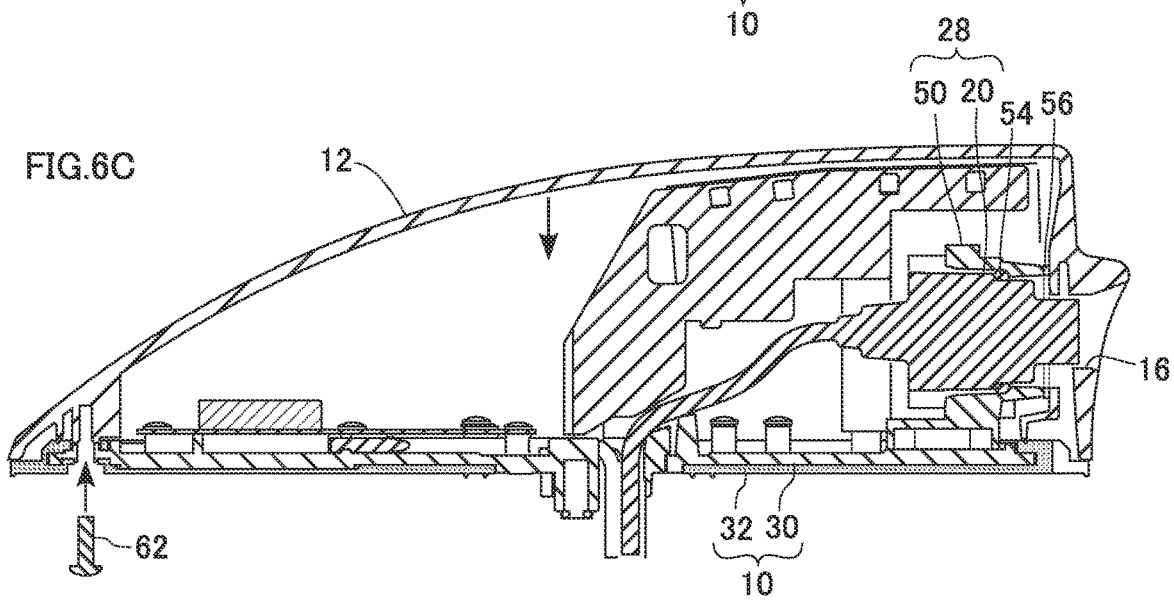

FIGS. 5A to 5D and FIGS. 6A to 6C illustrate a method for attaching the sealing portions. FIGS. 5A to 5D illustrate processes for attaching the second sealing portion, and FIGS. 6A to 6C illustrate processes for attaching the first sealing portion.

As illustrated in FIGS. 5A to 5D, for attaching the second sealing portion, the seal ring 54 is firstly put around the camera 20 (FIG. 5A). The seal ring 54 is fitted to the stepped portion 57.

Subsequently, the camera 20 is inserted into the insertion hole 64 of the holder 50 (FIG. 5B). At this point, the seal ring 54 receives a compressing force in the radial direction in the process of insertion into the insertion hole 64 (FIG. 5C). The seal ring 54 having reached the tapered face 55 is also compressed in the axial direction, and compressed harder in the radial direction (FIG. 5D). The seal ring 54 thus fulfills a sufficient sealing function. In this state, screws, which are not illustrated, are fastened, and the camera 20 is thus fixed to and supported by the holder 50.

As illustrated in FIGS. 6A to 6C, for attaching the first sealing portion, the seal ring 56 is set in advance on the leading end face of the holder 50. Specifically, the seal ring 56 is adhered to the holder 50 with a double sided tape. All the components to be mounted, such as the antenna element 26 and the camera unit 28, are attached to the base member 10. The cover 12 is placed over the base member 10 from above (FIG. 6A). In this process, the cover 12 is slightly shifted backward relative to the base member 10 so that the cover 12 does not interfere with the seal ring 56.

Subsequently, in a state in which the inner face of the back side of the cover 12 faces the seal ring 56, the cover 12 is shifted frontward to be positioned at the attaching position relative to the base member 10 (FIG. 6B). In this process, the seal ring 56 is axially compressed, and thus fulfills a sufficient sealing function. In this state, the screws 62 are fastened, and the cover 12 and the base member 10 are thus fixed to each other (FIG. 6C). In this manner, the sealing with the first sealing portion and the second sealing portion is achieved.

As described above, in the present embodiment, in attaching processes for the antenna device 1, the seal ring 54 is radially compressed as the camera 20 is inserted in the holder 50, which enables the seal ring 54 to fulfill a sufficient sealing function. Furthermore, the seal ring 56 is axially compressed as the cover 12 is attached to the base member 10, which enables the seal ring 56 to fulfill a sufficient sealing function. In other words, the dimensions of the sealing members are set in view of the sizes of gaps between components and the attaching orientations thereof, which enables sufficient sealing effects to be produced only by using the attaching processes without any substantial change. The two sealing portions therefore simply and reliably fulfill the sealing functions.

Furthermore, using the single cover of the cover 12 only allows for enough room in the housing space S. Thus, the antenna device 1 can be kept compact even when the internal components thereof has increased. According to the present embodiment, the antenna device 1 therefore achieves space saving and sufficient waterproof performance.

In particular, in the present embodiment, urethane foam, which is resistant to water and easy to provide sufficient thickness and softness, is used as the first sealing portion. The urethane foam functions as an elastic body having a relatively high compressibility. Thus, even if the installation error is increased due to the superimposed dimensional tolerances caused by an increase in internal components or the like, the installation error can be absorbed at the first sealing portion.

Second Embodiment

Figure 7:
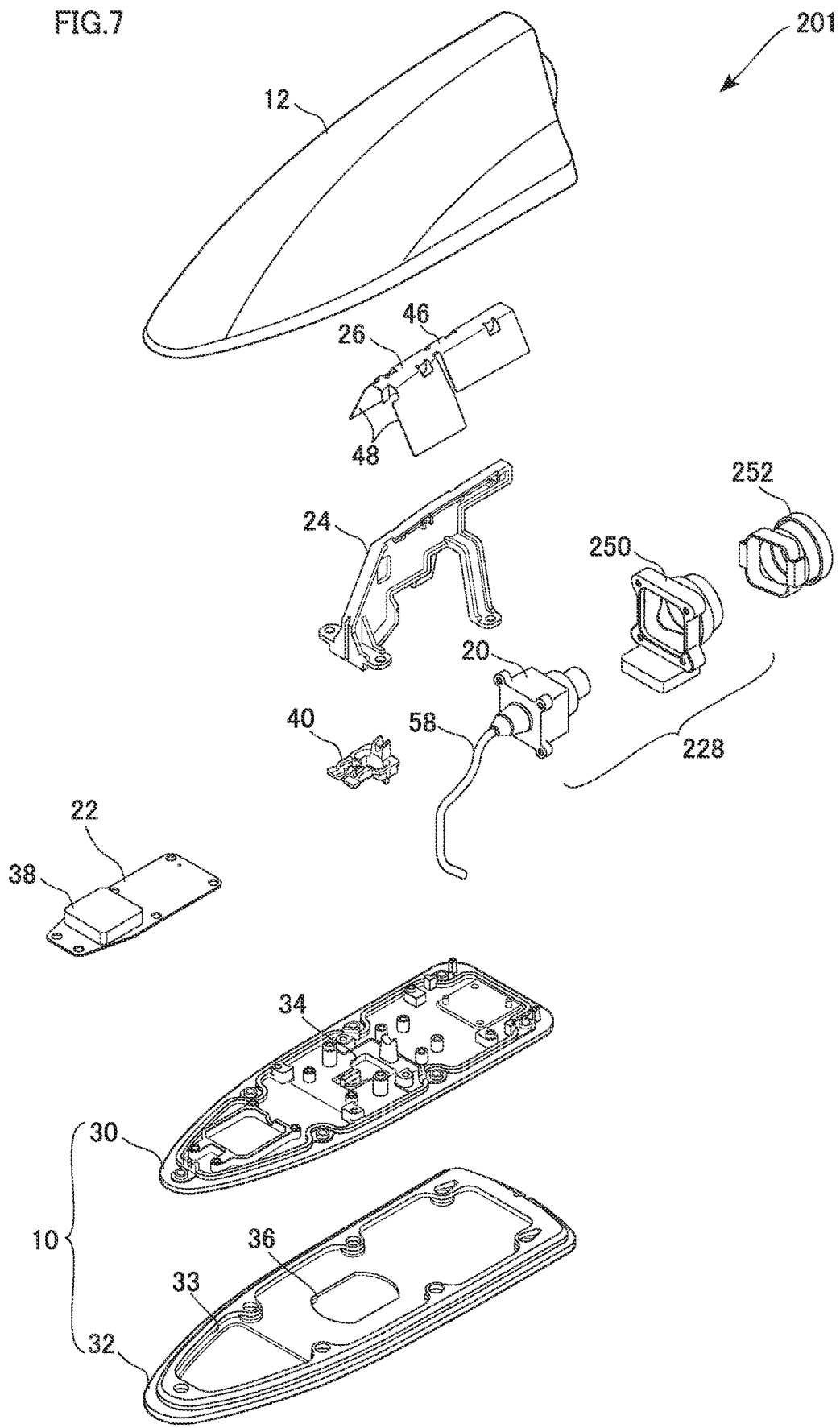
FIG. 7 is an exploded perspective view of an antenna device according to a second embodiment.

FIG. 7 is an exploded perspective view of an antenna device according to a second embodiment.

An antenna device 201 of the present embodiment is different from that in the first embodiment. In the present embodiment, the first sealing portion and the second sealing portion are integrated as a single sealing member. Hereinafter, the description will focus on the differences from the first embodiment.

The antenna device 201 includes the circuit board 22, the support member 24, the antenna element 26, a camera unit 228, and so on, which are attached onto the base member 10, and covered by the cover 12. The camera unit 228 functions as a "functional unit". A holder 250 included in the camera unit 228 has a shape different from the holder 50 in the first embodiment. A sealing member 252 is attached to the holder 250.

Figure 8A:
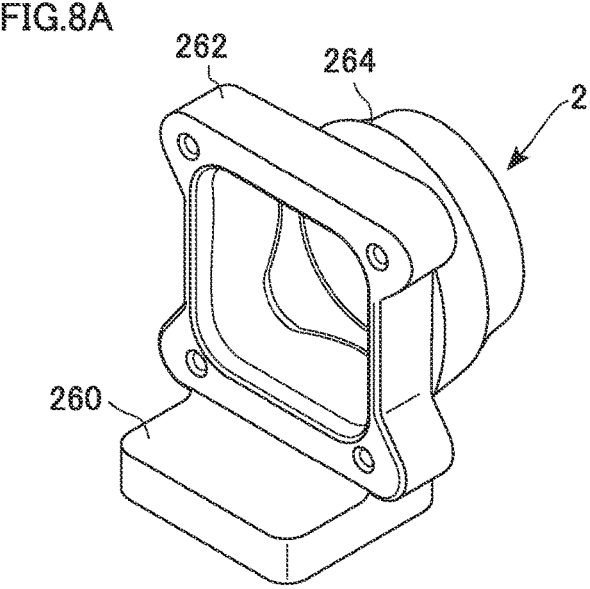
FIGS. 8A to 8E illustrate a structure of a holder.
Figure 8D:
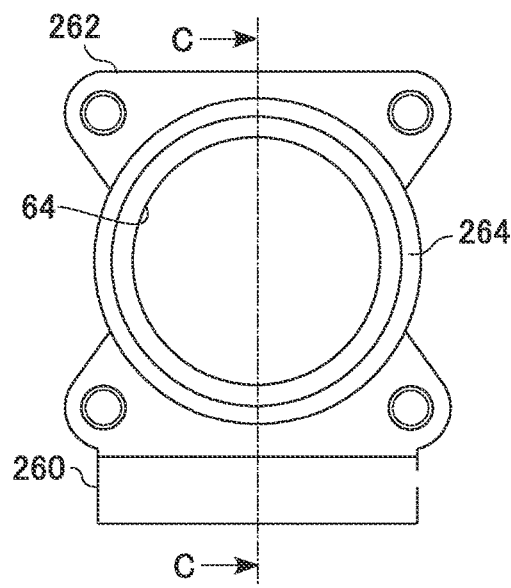
Figure 8B:
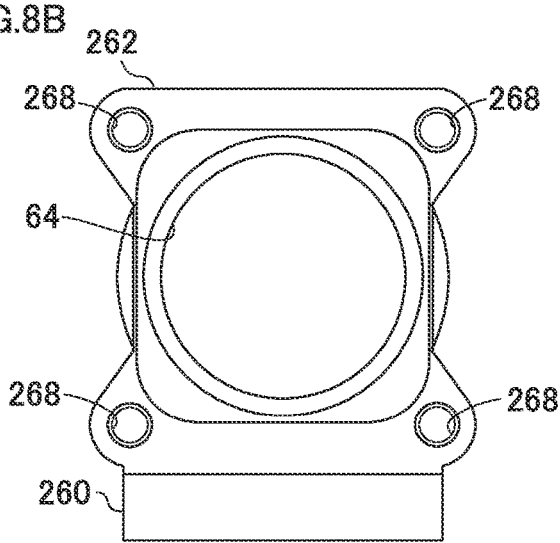
Figure 8E:
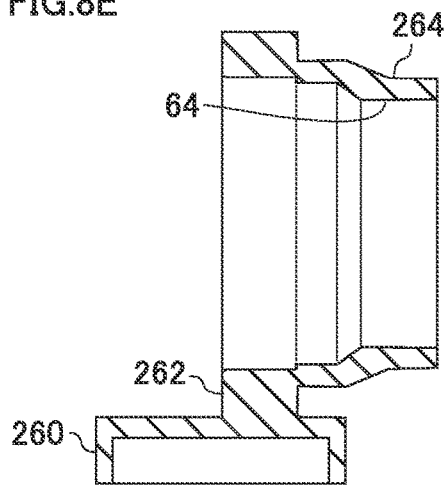
Figure 8C:
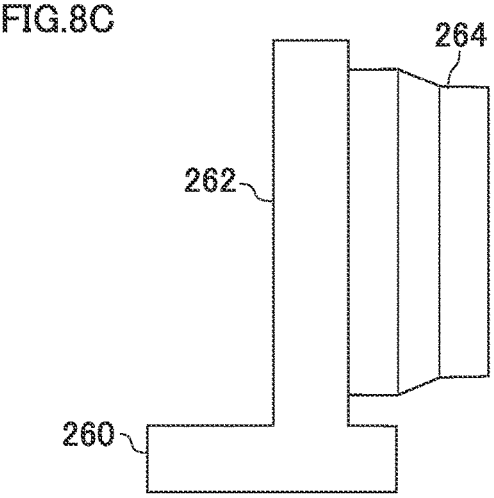

FIGS. 8A to 8E illustrate a structure of the holder 250. FIG. 8A is a diagonal view from the front side, FIG. 8B is a front view, FIG. 8C is a side view, and FIG. 8D is a rear view. FIG. 8E is a cross-sectional view along arrows C-C in FIG. 8D.

The holder 250 includes a base portion 260 to be fixed to the base member 10, a support portion 262 vertically standing on the base portion 260, and an insertion and fitting portion 264 coupled to the support portion 262. The insertion and fitting portion 264 has a stepped cylindrical shape, and has an inner circumferential face that is substantially complementary to the shape of the outer circumferential face of the camera 20. The support portion 262 is a wall at the front end of the insertion and fitting portion 264, and has a plurality of screw holes 268 for screws for fixing the camera 20.

Figure 9A:
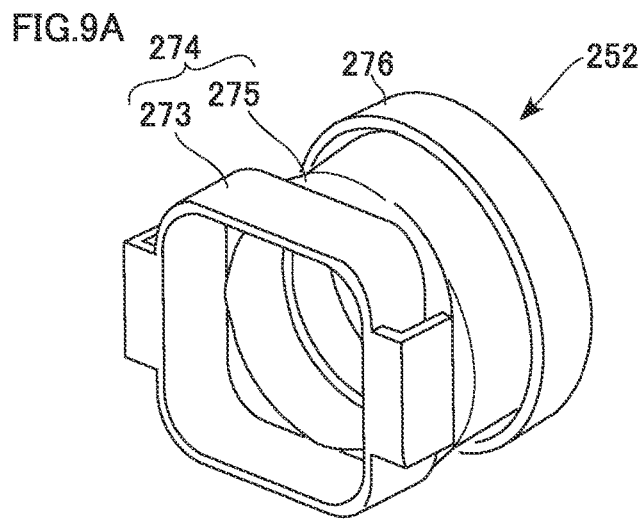
FIGS. 9A to 9E illustrate a structure of a sealing member.
Figure 9D:
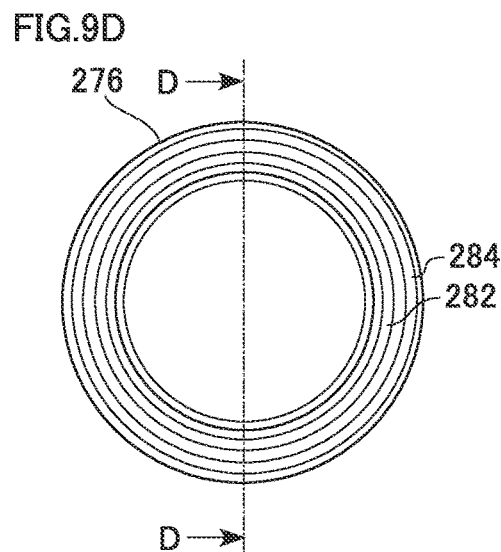
Figure 9B:
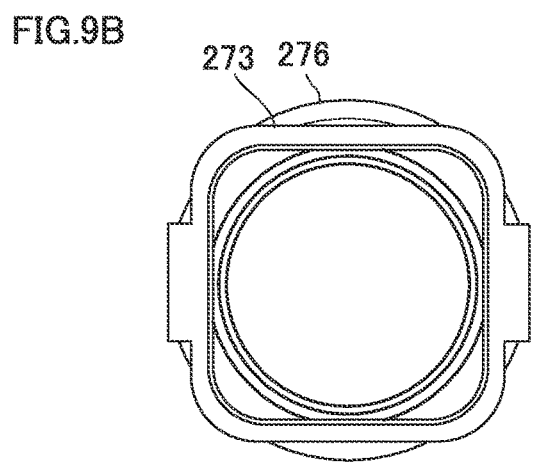
Figure 9E:
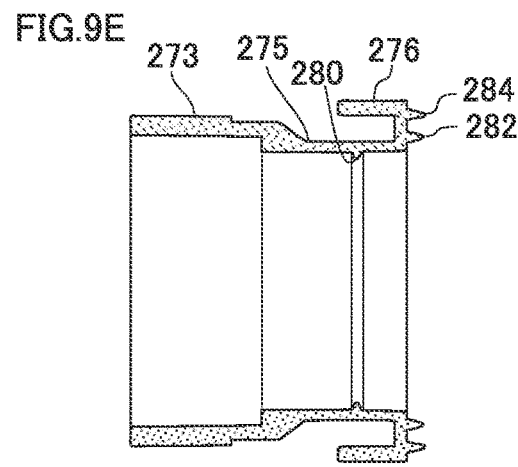
Figure 9C:
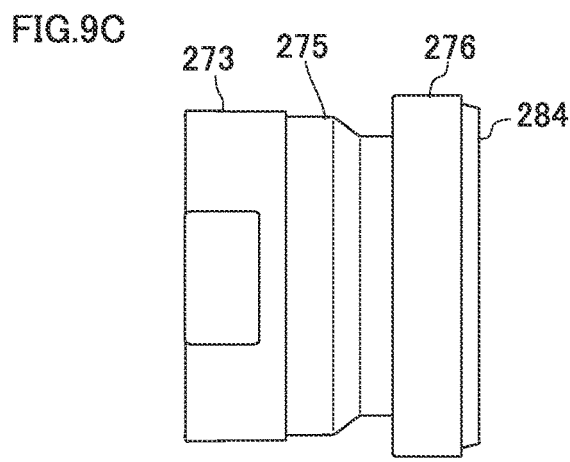

FIGS. 9A to 9E illustrate a structure of the sealing member 252. FIG. 9A is a diagonal view from the front side, FIG. 9B is a front view, FIG. 9C is a side view, and FIG. 9D is a rear view. FIG. 9E is a cross-sectional view along arrows D-D in FIG. 9D.

The sealing member 252 is made of urethane foam, and includes a cylindrical fitting portion 274 having a stepped cylindrical shape including a rectangular cylindrical portion 273 and a circular cylindrical portion 275. The cylindrical fitting portion 274 has an inner circumferential face that is complementary to the shape of the outer circumferential face of the camera 20, and an outer circumferential face that is complementary to the shape of the inner circumferential face of the holder 250. The circular cylindrical portion 275 has, at a leading end thereof, a fitting and attaching portion 276 having a folded-back shape with an L-like cross section. A rib 280 is formed along the inner circumferential face of the circular cylindrical portion 275. Annular ribs 282 and 284 are concentrically formed on the end face of the fitting and attaching portion 276. The ribs 282 and 284 function as the "first sealing portion", and the rib 280 functions as the "second sealing portion".

Figure 10:
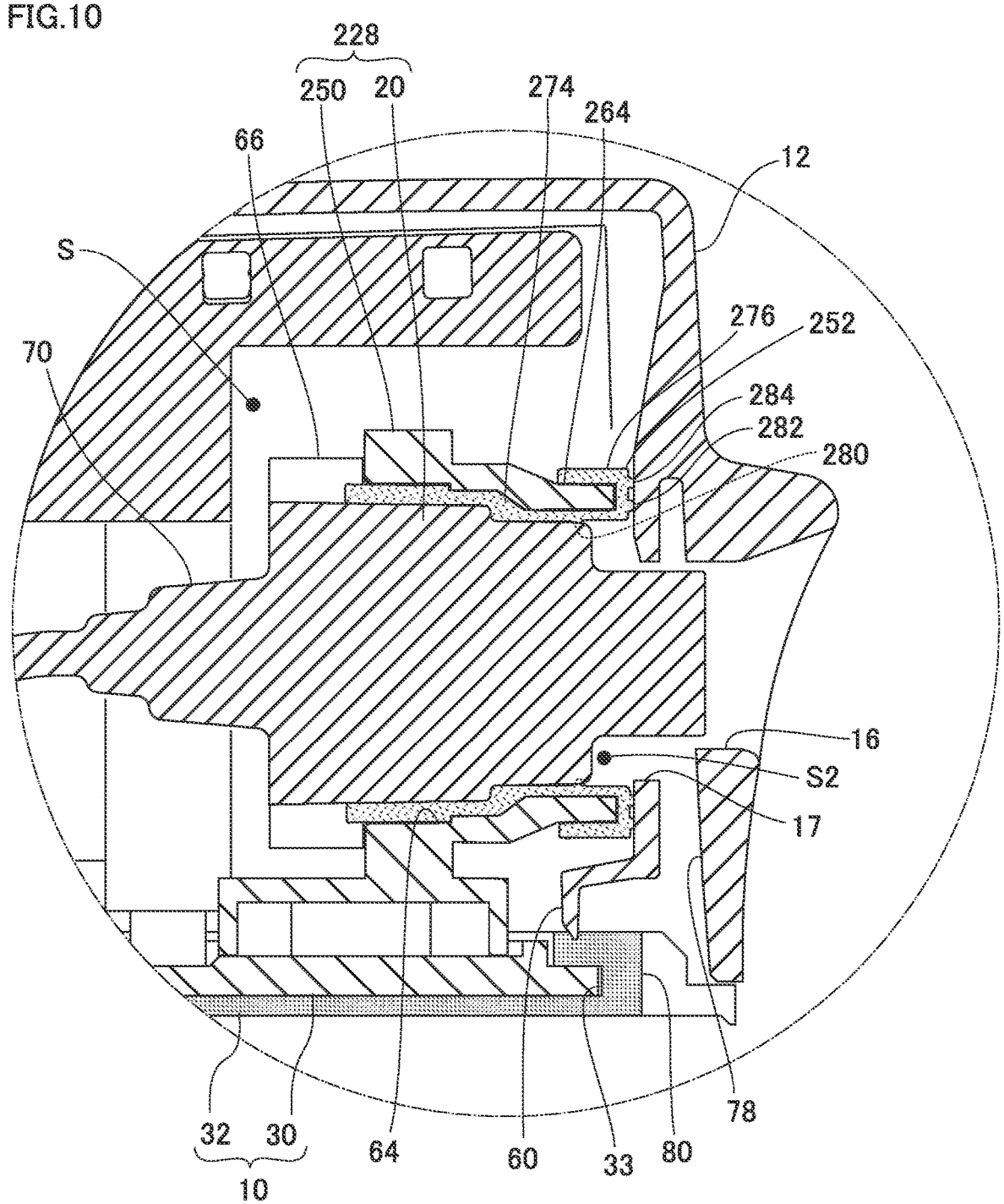
FIG. 10 is a partially enlarged cross-sectional view illustrating a camera unit and surrounding structures.

FIG. 10 is a partially enlarged cross-sectional view illustrating the camera unit 228 and its surrounding structures.

The sealing member 252 is attached to the inner face of the holder 250 with the fitting and attaching portion 276 fitted to the insertion and fitting portion 264. When the camera 20 is inserted into the insertion hole 64, the sealing member 252 is positioned between the outer circumferential face of the camera 20 and the inner circumferential face of the holder 250. Specifically, the cylindrical fitting portion 274 of the sealing member 252 is positioned between the outer circumferential face of the camera 20 and the insertion and fitting portion 264 of the holder 250. In this process, the rib 280 formed on the insertion and fitting portion 264 is radially compressed, and fulfills the sealing function.

In addition, when the cover 12 is attached to the base member 10, the fitting and attaching portion 276 of the sealing member 252 is positioned between the insertion and fitting portion 264 of the holder 250 and the inner circumferential face of the cover 12. In this process, the ribs 282 and 284 are at positions surrounding the opening 16, and compressed in the axial direction of the sealing member 252. This achieves the sealing function.

In the present embodiment as well, sufficient sealing effects are produced only by using the attaching processes without any substantial change, and the two sealing portions simply and reliably fulfill the sealing functions. Furthermore, the antenna device 201 achieves space saving and sufficient waterproof performance. Because the two sealing portions are formed integrally as a single sealing member, the number of processes for installation can be reduced, and the manufacture cost can also be reduced.

Note that, in the present embodiment as well, the exposure space S2 outside of the rib 280 communicates with the communication hole 78 via the opening 16. Thus, even if moisture is accumulated in the exposure space S2, it can be discharged to the outside via the communication hole 78.

Modification

Figure 11:
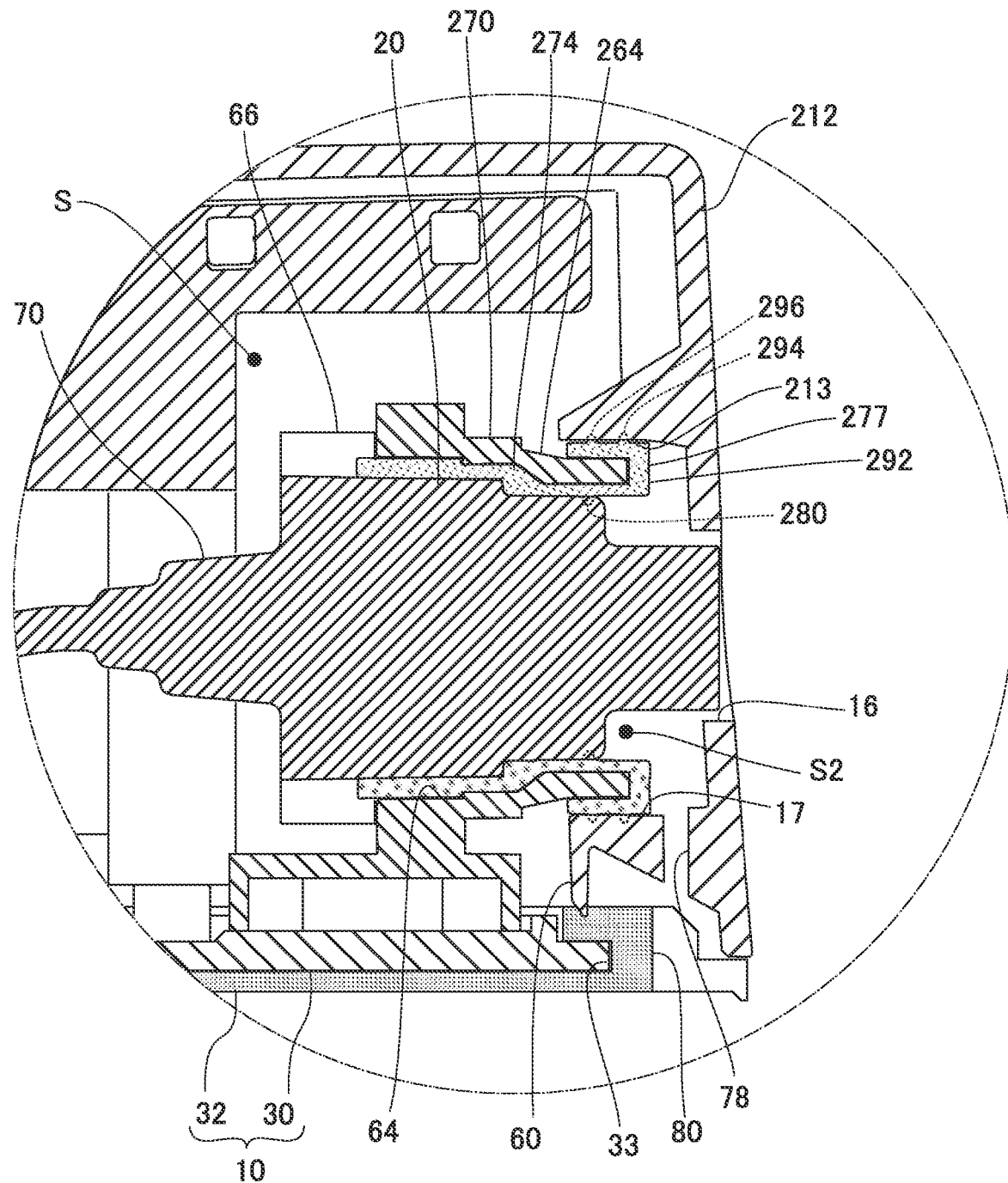
FIG. 11 is a partially enlarged cross-sectional view of a main part of an antenna device according to a modification.

FIG. 11 is a partially enlarged cross-sectional view illustrating a main part of an antenna device according to a modification.

In this modification, a sealing member 292 is made of urethane foam, and has a fitting and attaching portion 277 to be fitted to the insertion and fitting portion 264 of a holder 270. The sealing member 292 is different from the sealing member 252 of the second embodiment in the arrangement of ribs.

Specifically, annular ribs 294 and 296 are concentrically formed on the outer circumferential face of the fitting and attaching portion 277. The ribs 294 and 296 function as the "first sealing portion". An annular inner face 213 is formed on the inner side of a cover 212. The annular inner face 213 and the opening 16 are coaxial. The ribs 294 and 296 are inserted in the inner face 213, radially compressed, and thus fulfill the sealing function.

The first sealing portion according to the present modification is radially compressed owing to the dimensional difference between the inner diameter of the inner face 213 in the cover 212 and the outer diameter of the fitting and attaching portion 277. Thus, the compressibility thereof tends to be smaller than the type that is axially compressed like the first sealing portion in the second embodiment. In other words, the structure enabling axial compressing like that in the second embodiment achieves a better sealing performance.

Third Embodiment

Figure 12:
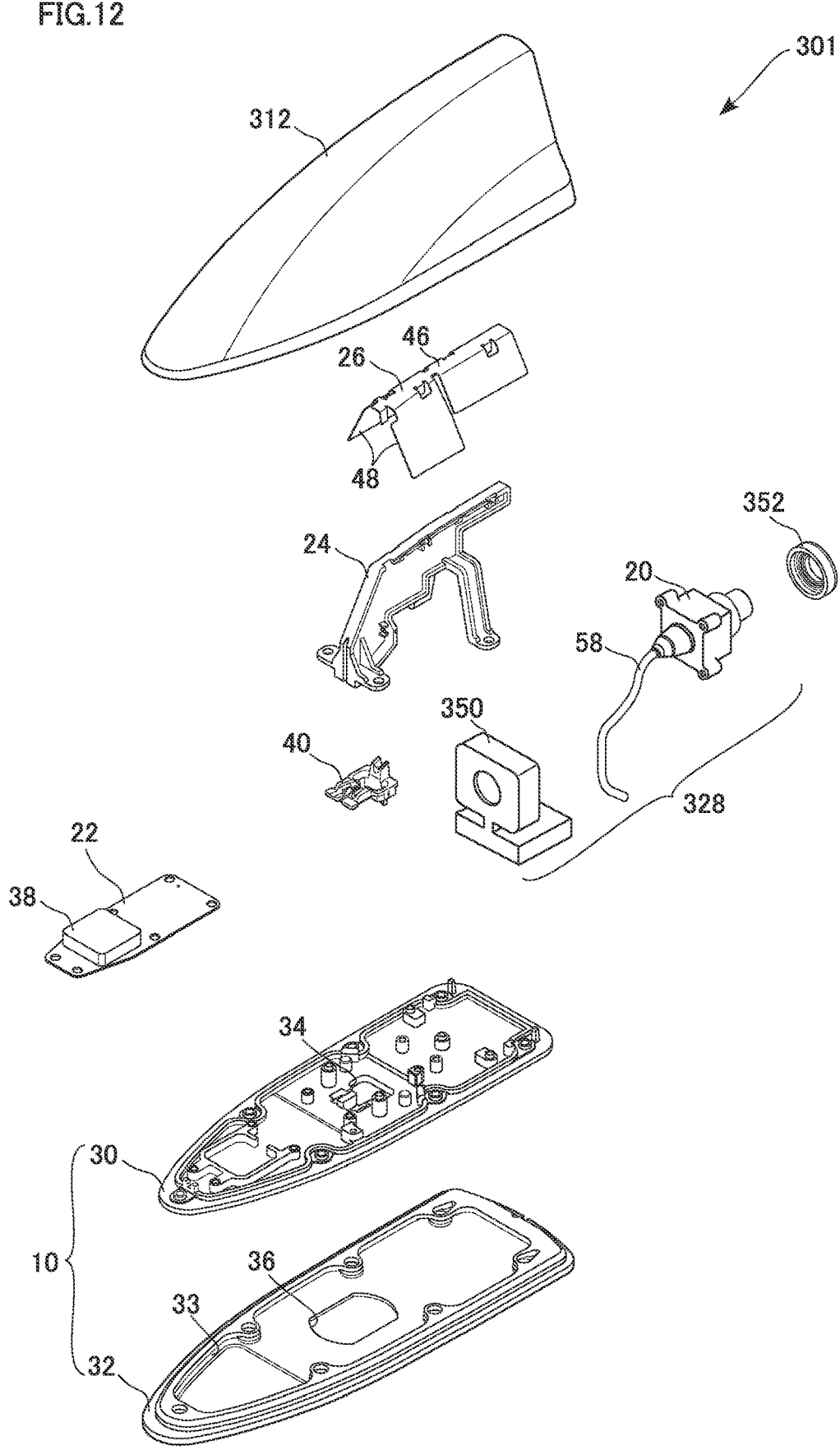
FIG. 12 is an exploded perspective view of an antenna device according to a third embodiment.

FIG. 12 is an exploded perspective view of an antenna device according to a third embodiment.

An antenna device 301 according to the present embodiment is different from those in the first and the second embodiments. In the present embodiment, the first sealing portion and the second sealing portion are both positioned between the camera and the cover. Hereinafter, the description will focus on the differences from the first and the second embodiments.

The antenna device 301 includes the circuit board 22, the support member 24, the antenna element 26, a camera unit 328, and so on, which are attached onto the base member 10, and covered by a cover 312. The camera unit 328 functions as a "functional unit". The camera unit 328 includes a holder 350 and the camera 20. A sealing member 352 is attached to the holder 350.

Figure 13A:
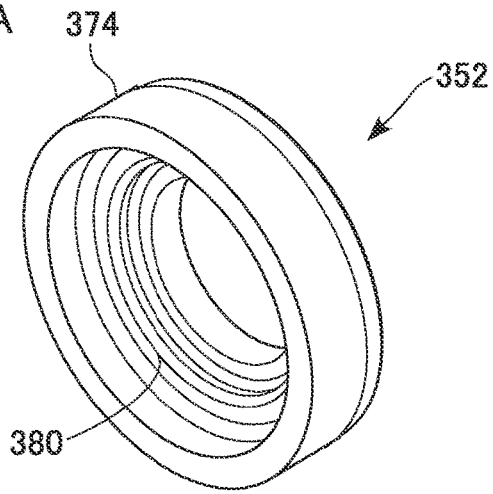
FIGS. 13A to 13E illustrate a structure of a sealing member.
Figure 13B:
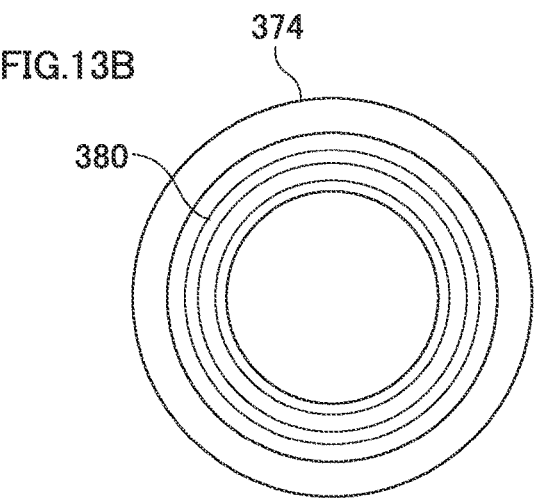
Figure 13C:
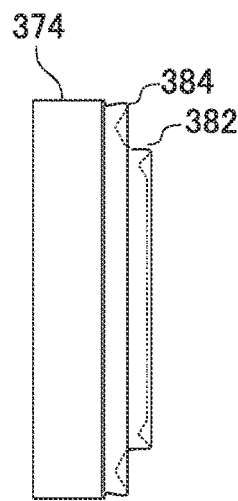
Figure 13D:
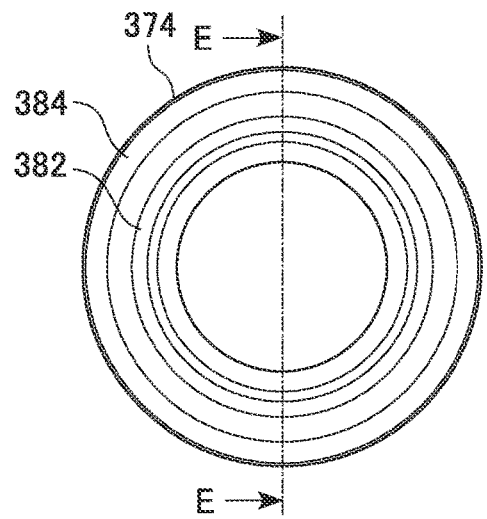
Figure 13E:
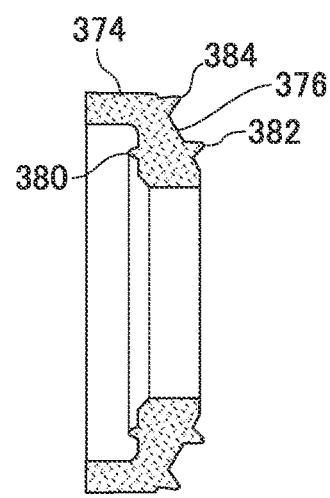

FIGS. 13A to 13E illustrate a structure of the sealing member 352. FIG. 13A is a diagonal view from the front side. FIG. 13B is a front view, FIG. 13C is a side view, and FIG. 13D is a rear view. FIG. 13E is a cross-sectional view along arrows E-E in FIG. 13D.

The sealing member 352 is made of urethane foam, and has a cylindrical body 374. A back part of the body 374 has a tapered portion 376 with its diameter decreasing backward. The tapered portion 376 has, on its inner side, a flat face perpendicular to the axis. An annular rib 380 is formed to protrude from the flat face. Annular ribs 382 and 384 are concentrically formed to protrude from the outer circumferential face of the tapered portion 376. The ribs 382 and 384 function as the "first sealing portion", and the rib 380 functions as the "second sealing portion".

Figure 14:
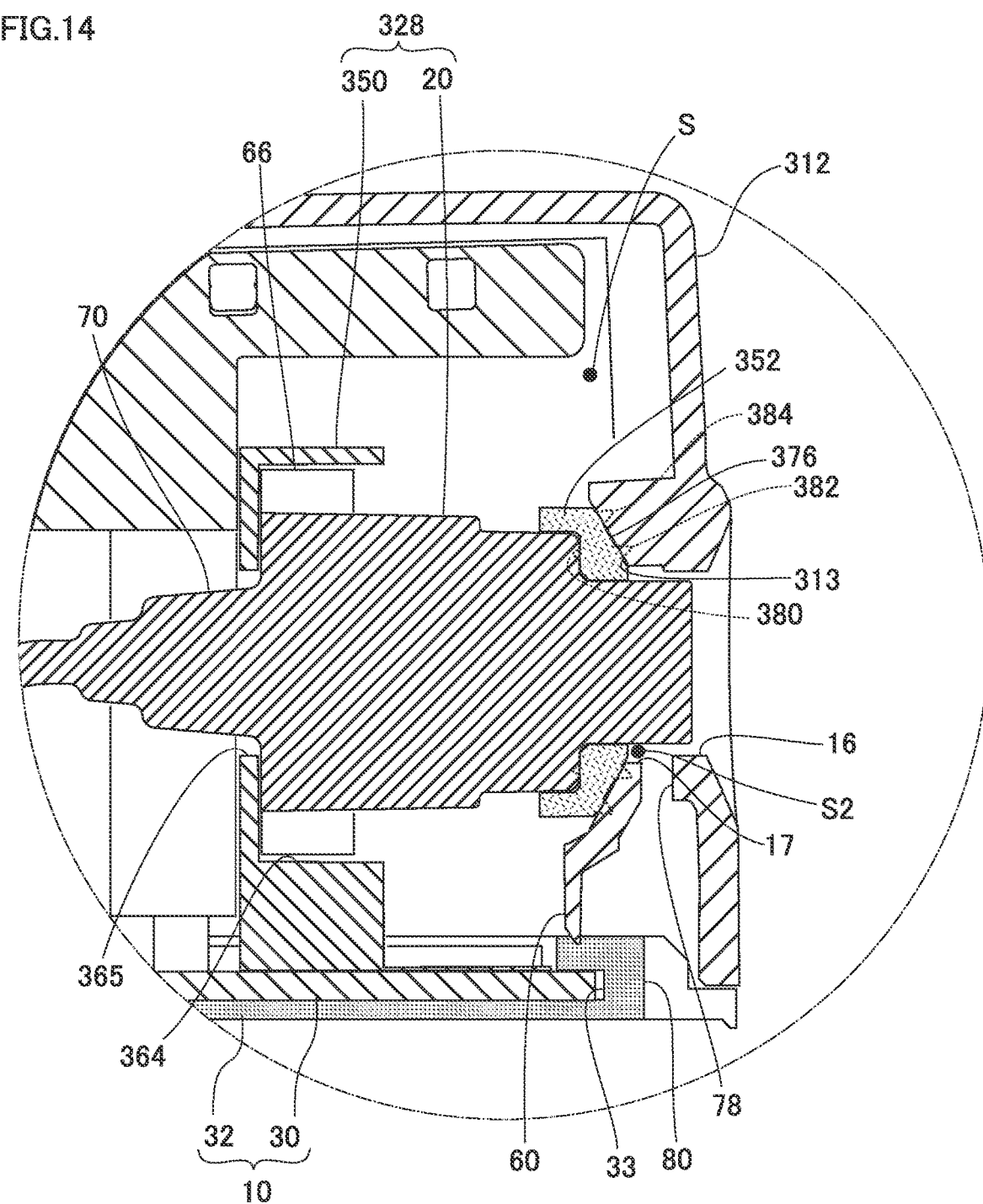
FIG. 14 is a partially enlarged cross-sectional view illustrating a camera unit and surrounding structures.

FIG. 14 is a partially enlarged cross-sectional view illustrating the camera unit 328 and its surrounding structures.

The camera 20 is attached to the holder 350 from the back, and fixed with a plurality of screws (not illustrated). The holder 350 has an insertion hole 364 that is widely open to the back, in which the camera 20 is partially contained. The holder 350 also has, at the center of the front end thereof, an insertion hole 365 with a small diameter. The connector 70 is inserted in the insertion hole 365 and connected with the camera 20.

The sealing member 352 has an inner circumferential face that is complementary to the shape of the outer circumferential face of the back side of the camera 20. In addition, an annular inner face 313 is formed on the inner side of the cover 312. The annular inner face 313 and the opening 16 are coaxial. The inner face 313 has an inverse tapered shape that is complementary to the shape of the outer circumferential face of the tapered portion 376. The ribs 382 and 384 protrude toward the inner face of the cover 312, and the rib 380 protrudes toward the outer circumferential face of the camera 20. When the cover 312 is attached to the base member 10, the tapered portion 376 is positioned between the inner face 313 and the camera 20. As a result, the ribs 380, 382, and 384 are compressed in the axial direction of the sealing member 352, and fulfill the sealing functions.

In the present embodiment as well, sufficient sealing effects are produced only by using the attaching processes without any substantial change, and the two sealing portions simply and reliably fulfill the sealing functions. Furthermore, the antenna device achieves space saving and sufficient waterproof performance. Because the two sealing portions are formed integrally as a single sealing member, the number of processes for installation can be reduced, and the manufacture cost can also be reduced.

Note that, in the present embodiment as well, the exposure space S2 outside of the rib 380 communicates with the communication hole 78 via the opening 16. Thus, even if moisture is accumulated in the exposure space S2, it can be discharged to the outside via the communication hole 78.

Although the embodiments of the present invention have been described above, the present invention is not limited to the embodiments and it goes without saying that various modifications could be further developed within the technical idea underlying the present invention.

In the embodiments described above, a camera is presented as an example of the functional component included in the functional unit. In a modification, a light guide (light emitting module) or other functional components may be used. For example, an LED unit may be supported by a holder, and a leading end portion of the LED unit may be exposed through the opening. Alternatively, a plurality of functional components may be provided, and the leading ends of the respective functional components may be individually exposed through openings of the cover. For each of the functional units, a waterproof structure in the embodiments and modifications described above can be applied to the functional unit around the opening.

In the embodiments described above, examples are presented in which the antenna base and the seal pad are provided as separate members and attached to each other to form the base member. In a modification, the antenna base and the seal pad may be formed integrally by molding using a mold. The seal pad may be made of flexible molding resin.

In the embodiments described above, the base member is constituted by a plurality of components (the antenna base and the seal pad). In a modification, the base member may be constituted by a single member. Specifically, the base member may be constituted only by an antenna base made of resin, and the joint between the cover and the antenna base may be sealed in a watertight manner by welding, adhesion, or the like. In the former case, with the cover and the antenna base attached, they can be joined by laser irradiation along their circumferential edges.

In the embodiments described above, the antenna base is constituted by a single member. In a modification, the antenna base may be constituted by a plurality of members. For example, a first base made of metal (hereinafter referred to as a "metal base") and a second base made of resin (hereinafter referred to as a "resin base") may be attached to each other to form an antenna base. An opening may be formed in a central area of the resin base, and the metal base may be attached in such a manner as to close the opening. An insertion hole through which a cable passes may be formed at the center of the metal base. The roof fixing portion may be integrated with the metal base. A lower face of the metal base is electrically connected with the roof panel. The resin base may be covered by a seal pad.

Alternatively, the cover and the resin base may be joined together in a watertight manner by welding or the like without a seal pad.

In the embodiments described above, the support member for supporting the antenna element and the holder for supporting the functional components are separate members. In a modification, the support member and the holder may be formed integrally. A part corresponding to the support member may be formed as part of the "holder".

In the embodiments described above, examples are presented in which the holder and the antenna base are separate members, and the holder is fixed to the antenna base (base member). In a modification, the antenna base and the holder may be formed integrally. For example, a protrusion or the like may be molded integrally with the antenna base (resin base) by injection molding of a resin material, and the protrusion may function as a holder. A holder may be formed as part of the antenna base. Specifically, the holder may be in any form as long as it is located on the "base member".

In the embodiments described above, examples of the structure are presented in which the antenna element is arranged in the housing space surround by the cover and the base member. In a modification, an antenna element may constitute part of the cover. An antenna element may be formed integrally with the cover by molding. In this case, the antenna element may be buried in the cover or may be partially exposed to the outside. Note that the "antenna element" used here may be any element constituting an antenna, and may be in any form (plate, coil, or other shapes).

In the embodiments described above, urethane foam, which is excellent in waterproof performance and has a relatively high compressibility, is employed as the first sealing portion. In a modification, an elastomer, rubber, or other elastic bodies having a sealing function may be employed. For example, ethylene propylene diene monomer (EPDM) rubber is suitable as an elastic body excellent in waterproof performance.

In the first embodiment, a material used for the first sealing portion is different from that for the second sealing portion. Specifically, a material having a higher compressibility and being softer than the second sealing portion is used for the first sealing portion. In a modification, a material may be used for both of the sealing portions. The material for both of the sealing portions may be an elastic body such as urethane foam. Alternatively, the sealing portions may be O rings.

In the second embodiment, an example of a structure is presented in which two ribs 282 and 284 are formed on the end face of the sealing member 252 and one rib 280 is formed on the inner circumferential face thereof. In the third embodiment, an example of a structure is presented in which two ribs 382 and 384 are formed on the outer circumferential face of the sealing member 352 and one rib 380 is formed on the inner circumferential face thereof. In other words, the first sealing portion is constituted by two ribs, and the second sealing portion is constituted by one rib. In a modification, the first sealing portion may be constituted by three or more ribs, or by a single rib. The second sealing portion may be constituted by a plurality of ribs. A rib constituting the first sealing portion and a rib constituting the second sealing portion may have different heights from each other. The structure such as the shape and the size of the first sealing portion may differ from that of the second sealing portion, so that the first sealing portion has a higher compressibility than the second sealing portion.

In the first and the second embodiments, examples are presented in which the first sealing portion is arranged between the holder and the cover, and the second sealing portion is arranged between the holder and the functional component (camera). In the third embodiment, an example is presented in which the first sealing portion and the second sealing portion are arranged between the holder and the functional component (camera). The "sealing portions" used herein fulfill the sealing function when the components are attached. In a modification, part of a functional component may have the function of the holder (a housing of a functional component may function as the holder). In addition, a single sealing member that functions as a "sealing portion" may be arranged between the outer face of the functional unit and the inner face of the cover.

While the antenna element 26 is made of metal in the embodiments described above, the antenna element 26 may be made of conductive resin or other conductive materials.

In the embodiments described above, examples are presented in which antenna elements applicable to AM, FM, and GPS are housed in the housing space of the antenna device. In a modification, antenna elements applicable to XM, GNSS, DAB, V2X, TEL, or the like may be housed. The antenna device may be a combined antenna device on which a plurality of antenna elements are mounted to support a plurality of frequency bands.

While examples of a shark fin antenna are presented in the embodiments described above, the space saving effect of the sealing structures described above is significantly produced for any low profile antenna device. Note that the sealing structures described above are not limited to application to low profile antenna devices, but are obviously applicable to any antenna device in which a housing space is formed between a cover and a base member.

While the antenna device is to be installed on a roof panel in the description of the embodiments, the antenna device may be installed at other positions of a vehicle body such as a spoiler or a trunk panel.

While examples of antenna devices are presented in the embodiments described above, the sealing structures described above may also be applied to a vehicle exterior device including no antenna element. The sealing structures may be applied to a vehicle exterior device, such as a light emitting device or an illumination device including a light emitting module, and an imaging device including a camera.

The present invention is not limited to the embodiments described above and modifications thereof, and any component thereof can be modified and embodied without departing from the scope of the invention. Components described in the embodiments and modifications can be combined as appropriate to form various inventions. Some components may be omitted from the components presented in the embodiments and modifications.

What is claimed is:
1. A vehicle exterior device comprising:
a base member;
a single cover attached to the base member in a watertight manner, the single cover and the base member forming a housing space therebetween, the single cover having
at least one opening,
an outer face that defines an outer most surface of the vehicle exterior device, and
an inner face that defines the housing space;
a functional unit including
a holder located on the base member in the housing space, the holder having a insertion hole, the inser- tion hole and the opening sharing a coaxial axis such that the insertion hole coaxially communicates with the opening, and a functional component inserted into the insertion hole and supported by the holder with a leading end thereof being exposed through the opening;

a first sealing portion located around the opening between an open end of the holder and the inner face of the single cover so as to directly contact with the inner face of the single cover, the first sealing portion being independently formed as a separate member from the single cover and being made of a different material from the single cover; and a second sealing portion located, in a perpendicular direction that is perpendicular to a coaxial direction along the coaxial axis, between an inner circumferential face of the holder and an outer circumferential face of the functional component, the inner circumferential face of the holder defining the insertion hole.

2. The vehicle exterior device according to claim 1, further comprising:

a circuit board located in the housing space; and an antenna element connected with the circuit board, wherein the vehicle exterior device being a vehicular antenna device.

3. The vehicle exterior device according to claim 2, wherein the functional component is a camera.

4. The vehicle exterior device according to claim 1, wherein the first sealing portion fulfills a sealing function by being compressed in a direction in which the open end and the inner face approach each other when the single cover is attached to the base member.

5. The vehicle exterior device according to claim 1, wherein the first sealing portion is fixed to the holder, and fulfills a sealing function by being compressed in a direction in which the inner face and the open end approach each other when the single cover is attached to the base member.

6. The vehicle exterior device according to claim 5, wherein the second sealing portion fulfills a sealing function by being radially compressed when the functional component is inserted into the insertion hole.

7. The vehicle exterior device according to claim 6, wherein the inner circumferential face of the holder has a tapered face with a diameter decreasing toward the opening, and the second sealing portion is pressed against the tapered face as the functional component is inserted.

8. The vehicle exterior device according to claim 1, wherein the second sealing portion fulfills a sealing function by being radially compressed when the functional component is inserted into the insertion hole.

9. The vehicle exterior device according to claim 8, wherein the inner circumferential face of the holder has a tapered face with a diameter decreasing toward the opening, and the second sealing portion is pressed against the tapered face as the functional component is inserted.

10. The vehicle exterior device according to claim 1, wherein the first sealing portion and the second sealing portion are integrally formed as a single sealing member.

11. The vehicle exterior device according to claim 10, wherein the first sealing portion and the second sealing portion are each constituted by a rib protruding from a circumferential face of the sealing member.

12. The vehicle exterior device according to claim 1, wherein the single cover has a side wall having a communication hole extending downward from the opening and being open to outside, and an exposure space being outside of the second sealing portion and surrounded by the holder and the functional component communicates with the communication hole via the opening.

13. The vehicle exterior device according to claim 1, wherein the functional component is a camera.

14. The vehicle exterior device according to claim 1, wherein the holder is fixed to the base member.

15. The vehicle exterior device according to claim 1, wherein the first sealing portion fulfills a sealing function by being compressed in an approaching direction and by directly contacting the inner face of the single cover when the single cover is attached to the base member, and the approaching direction is a direction in which the open end and the inner face approach each other.

* * * * *